United States Patent [19]

Fan

[11] Patent Number: 5,521,989
[45] Date of Patent: May 28, 1996

[54] BALANCED ERROR DIFFUSION SYSTEM

[75] Inventor: Zhigang Fan, Webster, N.Y.

[73] Assignee: Xerox Corporation, Stamford, Conn.

[21] Appl. No.: 102,330

[22] Filed: Aug. 5, 1993

[51] Int. Cl.$^6$ ................................................. G06K 9/38
[52] U.S. Cl. .......................................... 382/270; 382/252
[58] Field of Search ............................ 382/50, 54, 270, 382/271, 272, 273, 252, 251; 358/456, 457, 458, 459, 465, 466

[56] References Cited

U.S. PATENT DOCUMENTS

| | | | |
|---|---|---|---|
| 4,339,774 | 7/1982 | Temple | 358/283 |
| 4,554,593 | 11/1985 | Fox et al. | 382/50 |
| 4,733,230 | 3/1988 | Kurihara et al. | 340/728 |
| 4,876,610 | 10/1989 | Ohsawa et al. | 358/443 |
| 4,924,322 | 5/1990 | Kurosawa et al. | 358/448 |
| 4,955,065 | 9/1990 | Ulichney | 382/50 |
| 4,958,238 | 9/1990 | Katayama et al. | 358/456 |
| 4,969,052 | 11/1990 | Ishida et al. | 358/457 |
| 5,008,950 | 4/1991 | Katayama et al. | 382/50 |
| 5,014,333 | 5/1991 | Miller et al. | 382/54 |
| 5,045,952 | 9/1991 | Eschbach | 358/447 |
| 5,077,615 | 12/1991 | Tsuji | 358/298 |
| 5,077,812 | 12/1991 | Kanno et al. | 382/50 |
| 5,107,346 | 4/1992 | Bowers et al. | 358/447 |
| 5,130,823 | 7/1992 | Bowers | 358/465 |
| 5,201,013 | 4/1993 | Kumagai | 382/50 |
| 5,208,871 | 5/1993 | Eschbach | 382/41 |
| 5,243,443 | 9/1993 | Eschbach | 358/456 |

FOREIGN PATENT DOCUMENTS 1-97066   4/1989   Japan .

OTHER PUBLICATIONS

Haruhara et al. "Picture Processing Method", Translation of Japanese Patent 1-97066.

Floyd and Steinberg "An Adaptive Algorithm for Spatial Greyscale", Proceedings of the SID 17/2, 75–77 (1976).

Jarvis, et al. "A Survey of Techniques for the Display of Continuous Tone Pictures on Bilevel Displays", Computer Graphics and Image Processing, vol. 5, pp. 13–40 (1976).

Stucki, "MECCA—A Multiple–Error Correction Computation Algorithm for Bilevel Image Hardcopy Reproduction", IBM Res. Rep. RZ1060 (1981).

"Images from Computers" by M. R. Schröder in IEEE Spectrum, pp. 66–78 (1969).

"Design of Optimal Filters for Error–Feedback Quantization of Mono–Chrome Pictures" by Jung Guk Kim and Gil Kim, Information Sciences 39, pp. 285–298 (1986).

R. Ulichney, "Digital Halftoning", The MIT Press, Cambridge, Mass. (1987) pp. 239–264.

*Primary Examiner*—Joseph Mancuso
*Assistant Examiner*—Gerard Del Rosso
*Attorney, Agent, or Firm*—Thomas B. Zell

[57] ABSTRACT

A digital halftoning system with balance error diffusion, converts a scanline at a time of an image from a first pixel density to a second pixel density, where the first pixel density is greater than the second pixel density. Quantization errors resulting from the conversion is dispersed to surrounding pixels, in a manner which is more symmetric than standard error diffusion techniques. Initially, errors are dispersed in a conventional manner during a first scanline pass or forward scanline pass of an image. Subsequently, errors are again dispersed during a second scanline pass or backwards scanline pass. The two pass error diffusion technique insures that error propagated throughout the image do not create or form correlated artifacts such as worms in the converted image.

17 Claims, 4 Drawing Sheets

BALANCED ERROR DIFFUSION SYSTEM

The present invention relates to a digital halftoning system, and more particularly, a digital halftoning system that uses a two pass error diffusion technique to reduce the formation of visible correlated patterns or artifacts typically generated by conventional error diffusion techniques.

BACKGROUND OF THE INVENTION

Digital halftoning converts image information comprising a large number of gray scaled pixel values to a reduced number of gray scaled pixel values in order that image information be rendered for display or hardcopy (printed) output. Image information, be it color or black and white, is commonly derived by scanning, initially at least, in a gray level format containing a large number of gray density levels, e.g.: 256 levels for black and white and more than 16 million ($256^3$) levels for color, which is usually not reproducible on standard printing and display systems. The term "gray level" is used herein to described data for both black and white and color applications. For example, standard printing systems print in a limited number of levels, either a spot or a no spot in the binary case, or a limited number of levels associated with the spot, such as four in the quaternary case. Thus, image information encoded by a large number of gray level values must be converted to a fewer number of gray level values in order that the image information be rendered on typical display and printing systems.

One method of converting gray level pixel image data to binary level pixel image data is through the use of dithering or screening processes. In such arrangements, over a given area, each gray level pixel within the area is compared to one of a set of preselected thresholds, comprising a matrix of threshold values or a halftone cell. The effect of such an arrangement is that, for an area where the image is gray, some of the thresholds within the matrix will be exceeded, while others are not. In the binary case, the portions of the matrix, or cell elements, in which the thresholds are exceeded are printed as black, while the remaining elements are allowed to remain white. The effect of the distribution of black and white over the cell is integrated by the human eye as gray.

Dithering presents problems, however, in that the amount of gray within an original image is not maintained exactly over an area, because the finite number of elements inside each halftone cell only allows the reproduction of a finite number of gray levels. The error arising from the difference between the threshold value and the actual gray level value at any particular cell is simply thrown away. This results in loss of image information. Dithering creates significant image artifacts because it ignores this error completely, for example, bands or false contour artifacts, can be seen in smooth image areas. In this example, the image input gray level varies smoothly over an area while the halftoned image has to make a transition from one halftone dot (gray level) to another This transition can clearly be seen as a band or pattern running through smooth image parts.

Other techniques exist that convert gray images to binary or a lesser level of gray while attempting to preserve gray density of the images. Error diffusion, for example, attempts to maintain gray density by making the conversion from gray pixels to binary or other level pixels on a pixel-by-pixel basis. The procedure examines each pixel value with respect to a threshold, and the difference between the gray level pixel value and the threshold is then forwarded to a selected group of neighboring pixels, in accordance with a weighting scheme. The corrected image pixels are then considered input to the processing. In this way, the error calculated includes all errors previously made.

Basic error diffusion is proposed by Floyd and Steinberg, in "An Adaptive Algorithm for Spatial Greyscale", Proceedings of the SID 17/2, 75–77 (1976) (hereinafter, "Floyd and Steinberg"). Modifications to the error diffusion algorithm taught by Floyd and Steinberg have been proposed, e.g.: a different weighting matrix, as taught, for example, in "A Survey of Techniques for the Display of Continuous Tone Pictures on Bilevel Displays" by Jarvis et al., Computer Graphics and Image Processing, Vol. 5., pp. 13–40 (1976), and in "MECCA—A Multiple-Error Correction Computation Algorithm for Bi-Level Image Hardcopy Reproduction" by Stucki, IBM Res. Rep. RZ1060 (1981). Other, examples of Floyed and Steinberg error diffusion technique having enhanced error calculation and weight allocation schemes include U.S. Pat. Nos.: 5,208,871; 4,924,322; 4,339,774; 4,955,065; 5,045,952; 5,130,823; 5,014,333; 5,077,615; 4,969,052; 5,077,812; 4,876,610; and 4,733,230. Also of interest is U.S. patent application Ser. No. 07/755,380, entitled "Method For Quantization Gray Level Pixel Data With Application Of Under Compensated Error Diffusion" by R. Eschbach, which teaches a method for the application of under compensated error diffusion to a pixel quantizing method in the conversion of image data from a number of input levels that is relatively large with respect to a number of desired output levels.

An alternative error diffusion procedure is taught in "Images from computers" by M. R. Schröder (sometimes spelled Schroeder) in IEEE Spectrum, pp 66–78 (1969) (hereinafter Schröder). In this method the error is only calculated between the original input pixel and the output, neglecting all previously made errors. This method leads to a poorer gray level representation than Floyd and Steinberg but to higher image contrast. Modifications to the algorithm by Schröder are taught, for example, in "Design of Optimal Filters for Error-Feedback Quantization of Monochrome Pictures" by Jung Guk Kim and Gil Kim, Information Sciences 39, pp 285–298 (1986).

Since the Floyd and Steinberg error diffusion technique is not periodic in nature, it does not produce output images with repeating patterns in uniform image areas as does the dither or screening technique. Error diffusion, however, does introduce correlated patterns, sometimes called "worms", in uniform image areas particularly in shadow and highlight areas. Some schemes developed that try to minimize the worm effect are described by R. Ulichney in "Digital Halftoning", The MIT Press, Cambridge, Mass. (1987), which include: using random weights or thresholds (e.g. U.S. Pat. No. 5,130,823); increasing the size of the selected group of neighboring pixels (or window size); and applying a "serpent scanning" technique to the input image so that adjacent lines of the input image are processed in opposite directions (e.g. U.S. Pat. No. 4,955,065). Since these improvements are coupled with new artifacts or with a rise in noise level, they only tend to alleviate the worm problem and not eliminate it. There exists therefore a need to provide an improved digital halftoning system that eliminates correlated patterns while not introducing additional artifacts or higher noise levels.

All of the references cited herein are incorporated by reference for their teachings.

SUMMARY OF THE INVENTION

In accordance with the invention, there is provided a digital halftoning system which uses error diffusion that eliminates "worm" artifacts introduced by standard non-symmetric error diffusion techniques. The error diffusion technique of the present invention eliminates visible correlated patterns or artifacts by propagating digital halftoning quantization error in a balanced manner.

In accordance with one aspect of the invention, there is provided a digital halftoning system that uses balanced error diffusion while converting an original image at a first density to an output image at a second and lesser density. By dispersing the quantization error resulting from the conversion to surrounding pixels using error diffusion, the average image density of the original image is maintained in the converted image. Initially, quantization error is dispersed conventionally by using a first scanline pass or forward scanline pass of the original image. Subsequently, however, errors are again dispersed during a second scanline pass or backwards scanline pass of the original image.

In accordance with another aspect of the invention there is provided an apparatus that maintains the average density of an input image while converting the input image having image signals with K density levels that are ordered in successive scanlines to an output image with L density levels, where L is less than K, for output to a device capable of rendering images having L density levels. The apparatus includes a first memory for storing the input image signals. Means for adding to each input image signal stored in the memory an error correction signal to provide corrected image signals with adjusted density levels that reflect the average density level of the input image. Means for comparing each corrected image signal of the input image to a predefined threshold value to determine an output image signal defined by L density levels for each image signal of the output image. A second memory for storing the output image signal to be rendered on the output device that is limited to images having L density levels. Means for deriving quantization error for each output image signal determined by the comparing means. Means for propagating the derived quantization error of each image signal to a neighborhood of input image signals, the propagating means forming error correction signals to be directed to each input image signal using a fraction of the derived quantization error. Means for controlling the direction the propagating means distributes the derived quantization error to the neighborhood of input image signals, whereby the propagating means does not form correlated patterns in the output image The two pass error diffusion technique of the present invention insures that error propagated throughout the original image does not create or form correlated artifacts such as worms in the converted image. Unlike conventional error diffusion techniques, the present invention is an error diffusion technique that provides balanced dispersion of quantization error in order that artifacts such as correlated patterns do not appear in the output image.

These and other aspects of the invention will become apparent from the following descriptions to illustrate a preferred embodiment of the invention read in conjunction with the accompanying drawings in which.

Figure 1:
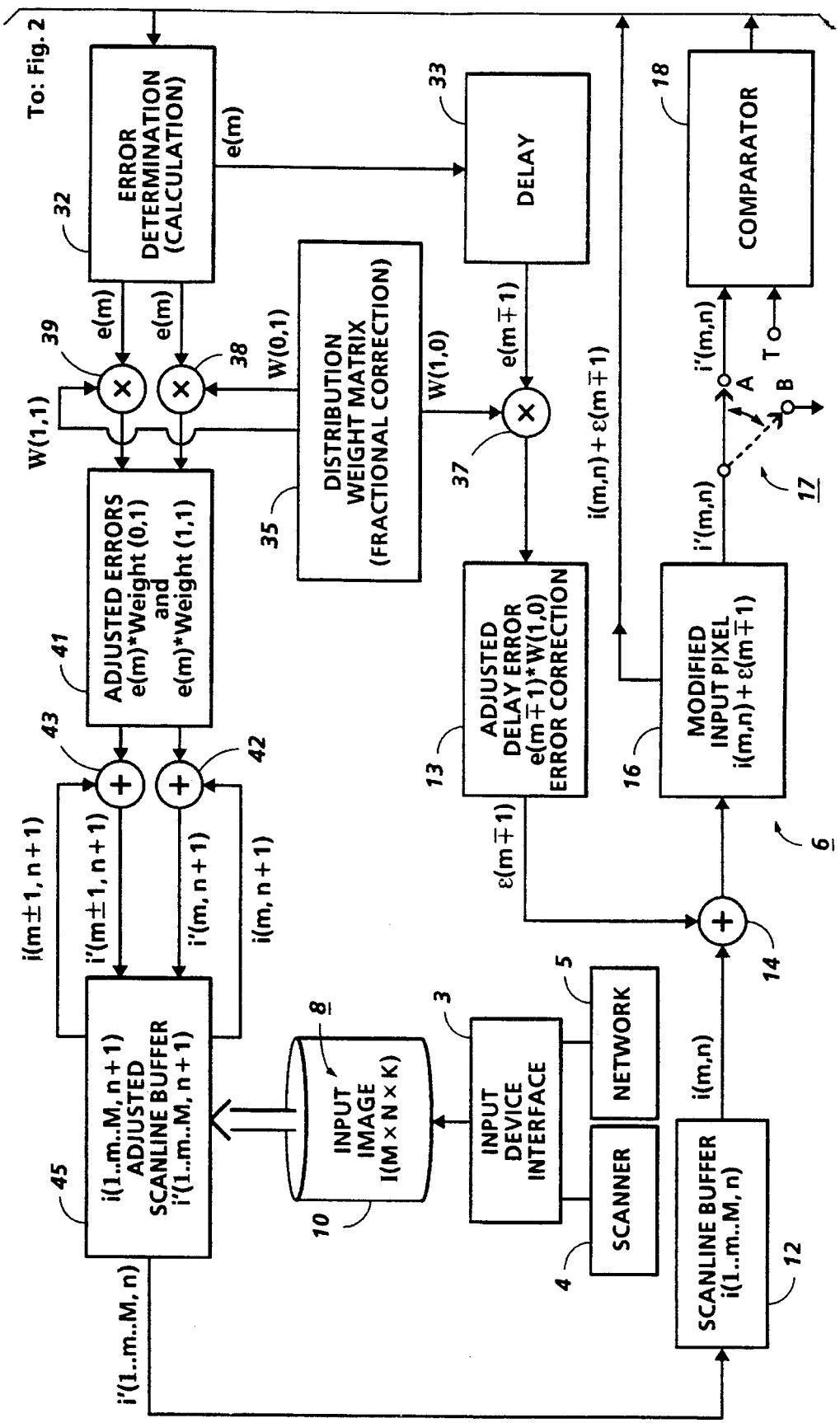
FIGS. 1 and 2 are block diagrams of a basic system for carrying out the present invention.
Figure 2:
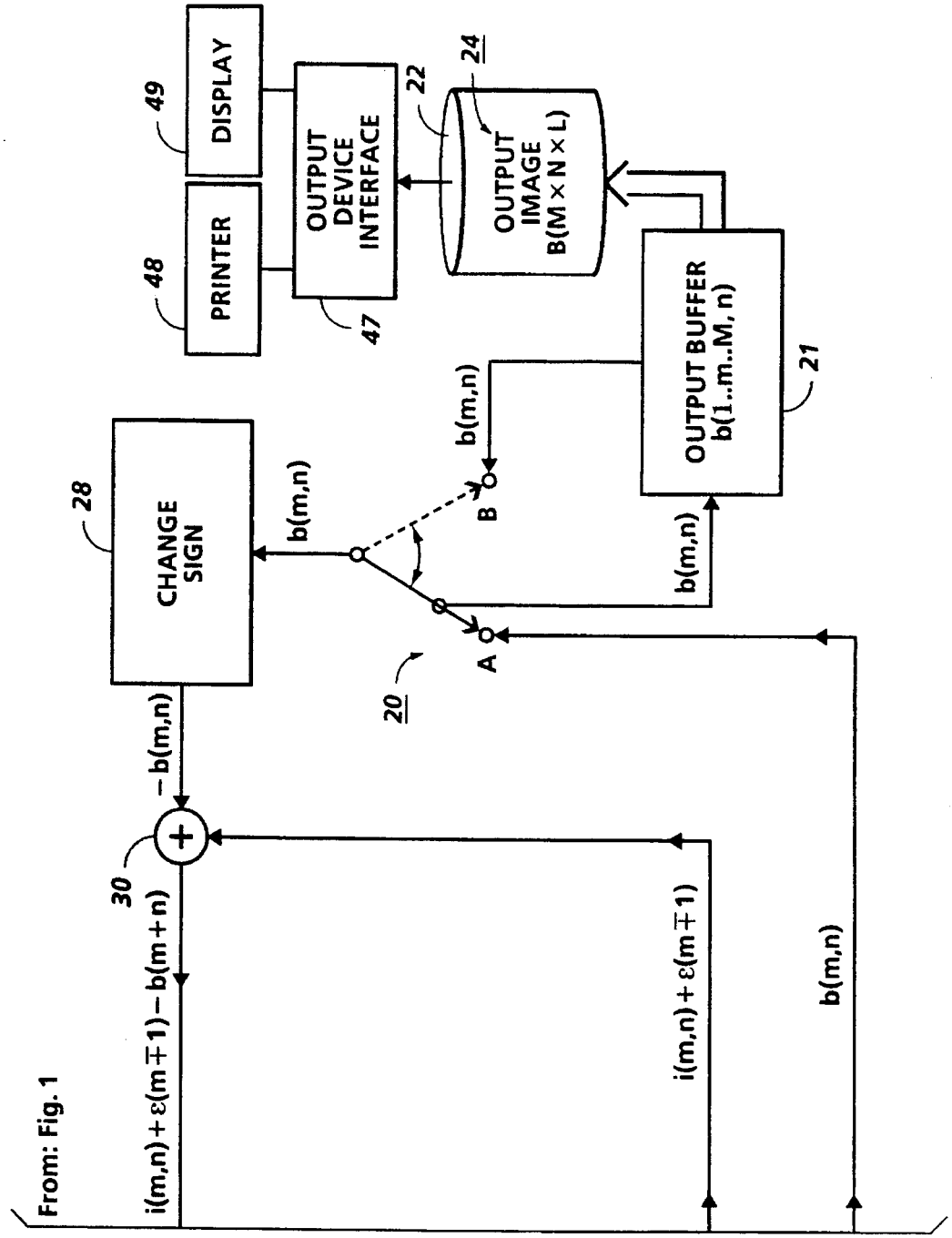

Referring now to the drawings where the showings are for the purpose of describing the preferred embodiment of the invention and not for limiting same, a general block diagram of image processing system 6 is shown in FIGS. 1 and 2. Input for image processing system 6 is in the form of electrical signals; the input to the system is coordinated using input device interface 3 which is adapted to receive signals representing input image 8 from scanner 4 and network 5. The input image 8 is defined in a series of scanlines 1-N where each scanline is composed of one through 1-M picture elements or pixels (i). Input image 8 is described by the matrix M×N which is composed of individual electrical signals or pixels i(m,n), where each pixel has pixel density information described by a number of gray levels K. Image processing system 6 converts input images of K pixel density levels to output images of L pixel density levels (where L is less than K) using an inventive two pass balanced error diffusion technique which maintains the average image pixel density of the input image 8.

The two pass technique diffuses error on each scanline of input image 8 first in a forward direction and then in a backward direction in order to eliminate the introduction of correlated patterns such as worms that can form in output image 24. Image input signals or pixels (i.e. electrical signals from input device interface 3) i(m,n) are arranged in a predetermined order to form input image 8, which is resident in input system memory 10 (such as, for example, a hard disk or floppy). Input image 8 is defined as I (M×N×K), where M represents the number of pixels in a scanline, N represents the number of scanlines in the input image and K represents the number of pixel density levels of each input image pixel. Input image 8 in the present embodiment has 256 gray levels and is derived for example using scanner 4. System 6 generates and stores in output image system memory 22 output image 24 which is defined as B (M×N×L), where M and N are as defined for input image I, and L represents a number of pixel levels which is less than K input pixel levels. Upon completing the conversion of input image 8 to output image 24, output image 24 is transmitted through output device interface 47 to an output device such as printer 48 or terminal display 49.

Briefly, system 6 generates output image 24 a scanline at a time (e.g. N=1,2,3 . . . ). During the first or forward pass of each scanline input pixel i(m,n) at K levels is converted to output pixel b(m,n) at L levels. Error from the input pixel conversion (or quantization) is defined for a single pixel i(m,n) by the difference between the input of the quantizer, which is a modified version of input pixel i(m,n) and the output pixel b(m,n). The image signal error generated from the conversion of an image signal is propagated to subsequent input pixels over a predetermined neighborhood surrounding converted input pixel i(m,n). The second or backwards pass of each scanline further diffuses quantization error in the opposite process direction (backwards instead of forwards). Unlike the first pass, the second pass does not generate an output pixel b(m,n); instead the output pixel b(m,n) generated from the first pass is used to determine the quantization error e(m) propagated during the second pass. Thus, system 6 during the forward scanline pass, generates output pixels and propagates quantization error for each pixel in a forward process direction, subsequently in a second of backwards scanline pass (of the same scanline), output pixel quantization error is propagated in the reverse process direction.

More specifically, during the first pass or the forward pass of each scanline (n) of input image 8 (where input pixels of scanline n are processed in the order 1,2,3, . . . , m), operational mode switches 17 and 20 are set to position A. Initially, scanline buffer 12 is loaded with a scanline of input image 8 (i.e. i(1 .. m .. M,n)). Subsequently, input pixel or signal i(m,n) is transmitted from scanline buffer 12 to adder 14. At signal adder 14, input pixel i(m,n) is added to adjusted error correction signal $\epsilon(m-1)$ described in detail later. The output of adder 14, modified input pixel i'(m,n), is stored in data latch 16. Modified input pixel i'(m,n) is transmitted from data latch 16 through operational mode switch 17, which is set to position A, to thresholding element (or comparator) 18. Thresholding element 18 compares modified input pixel i'(m,n) to threshold value T (which may vary as taught for example in U.S. Pat. No. 5,045,952), and the resulting output value pixel b(m,n) has a pixel density quantized from K levels representative of the modified input pixel i'(m,n) to L levels representative of the output pixel b(m,n) which is in turn output through output device interface 47 to printer 48 for example. Subsequent to thresholding input pixel i'(m,n), the resulting output of comparator 18, output pixel b(m,n), is transmitted through operational mode switch 20 which is set to position A. In position A, operation mode switch 20 provides two functions. The first function enables output pixel b(m,n) to be transmitted to scanline output buffer 21, which at the end of processing a scanline, is stored in output image memory 22 to form part of output image 24.

The second function of operation mode switch 20 when set to position A, enables the output pixel b(m,n) from comparator 18 to be input to sign change or inverter block 28. At adder 30, the output of the sign change block 28 is subsequently added to (or subtracted, using sign change block 28, from) the modified input pixel i'(m,n) stored in data latch 16. The output of adder 30, quantization error e(m), is the difference between the modified input pixel i'(m,n) and the output pixel b(m,n). Quantization error e(m), stored in data latch 32, is transmitted to delay latch 33 for storage of delayed quantization error $e(m\mp 1)$ for later distribution to the subsequent pixel on the current scanline (i.e. i(m+1,n)). Weights for error propagation are stored in memory buffer 35 as the matrix of weights W(m,n), discussed generally later. Adjusted error correction signal $\epsilon(m-1)$ mentioned previously is determined using multiplier 37, which derives the product of the weight $W(1,0)=3/8$ and delayed error e(m−1) stored in delay latch 33. Adjusted error correction signal $\epsilon(m-1)$ propagates a fraction (3/8) of the quantization error e(m). The adjusted error correction signal $\epsilon(m-1)$ is stored in data latch 13 before being added to input pixel i(m,n) at signal adder 14.

A part of quantization error e(m) is also propagated to the subsequent scanline (n+1) using weights $W(0,1)=1/8$ and $W(1,1)=3/16$ also stored in memory buffer 35. At multipliers 38 and 39, adjusted error correction signals $\epsilon(m)$ and $\epsilon(m+1)$ are determined from the product of quantization error e(m) and weights W(0,1) and W(1,1), respectively. The resulting adjusted error correction signals $\epsilon(m)$ and $\epsilon(m+1)$ are stored in data latch 41 for propagation to subsequent scanline (n+1). The subsequent scanline (n+1) is stored in scanline buffer 45. Adders 42 and 43 add respective adjusted errors $\epsilon(m)$ and $\epsilon(m+1)$ to subsequent scanline pixels i(m,n+1) and i(m+1,n+1), to form the modified pixel i'(m,n+1) and i'(m+1,n+1) respectively. The original pixel values i(m,n+1) and i(m+1,n+1) of scanline (n+1) stored in buffer 45 are replaced by modified pixel values i'(m,n+1) and i'(m+1,n+1), thereby adjusting the subsequent scanline (n+1) with a faction of error e(m) derived from the quantization of input pixels i(m,n) on the previous scanline (n).

During the second or backwards pass (where input pixels of scanline (n) are processed in the order M, M-1, M-2, .. ., 1), operational mode switches 17 and 20 are set to position B, making switch 17 a open circuit and effectively turning comparator 18 off. Similar to the first pass, input pixel i(m,n) stored in scanline buffer 12 adjusted at adder 14 to form modified input pixel i'(m,n). Switch 20 in position B enables output pixel b(m,n) which was previously calculated by the first pass and stored in output buffer 21, to be transmitted to sign change block 28. Similar to the first pass: At adder 30, the output of the sign change block 28 is subsequently added to the modified input pixel i'(m,n) stored in data latch 16; the output of adder 30, error e(m), is the difference between the modified input pixel i'(m,n) and the output pixel b(m,n), which is stored in data latch 32. Similar to the first pass, the pixel error e(m) stored in latch 32 is adjusted using weight matrix W(m,n) stored in memory 35. During the backwards pass adjusted error correction signal $\epsilon(m-1)$ mentioned previously becomes $\epsilon(m+1)$, and is determined similarly to adjusted error correction signal $\epsilon(m-1)$ using multiplier 37, by taking the product of the weight $W(1,0)=3/8$ and delayed error e(m+1) which is stored in delay latch 33.

On the second or backwards pass, adjusted error correction signal $\epsilon(m)$, is propagated onto the subsequent scanline (n+1) in a similar manner as performed during the forward pass described above. To briefly recapitulate, weights $W(0,1)=1/8$ and $W(1,1)=3/16$ stored in buffer 35 are multiplied at multipliers 38 and 39 respectively with quantization error e(m) stored in buffer 32. The output of multipliers 38 and 39 stored in data latch 41 are then added using adders 42 and 43 to subsequent scanline values i(m,n+1) and $i(m\mp 1,n+1)$ to form modified input pixel values i'(m,n+1) and $i'(m\mp 1, n+1)$ respectively.

After the first and second pass of the scanline (n), adjusted scanline i'(M,n+1) stored in buffer 45 is transmitted to scanline buffer 12. Thus subsequent scanline i'(M,n+1) becomes the current scanline i(M,n). Also after both passes of scanline (n), output buffer 21 storing output scanline b(M,n) is transmitted to output image memory 22 to form part of output image 24. (Note that input image memory 10 and output image memory 22 can be resident on the same or on separate physical memory devices (e.g. disk drive).)

The region in which quantization error e(m) can be distributed is defined as the region of support for weight matrix W(m,n). Generally, the region of support for W(m,n) can be any subset of the non-symmetric halfplane, more specifically W(m,n) can be non-zero for n>0, or n=0 and m≧0. In standard error diffusion, to retain an average gray level in the output image B(M×N×L), the sum of the weight matrix W(m,n) is required to be one or close to one. Using the present invention, this requirement remains almost the same, with the only difference being that W(m,n) is counted twice for n≠0. Therefore in the present embodiment:

$$W(1,0)+2W(0,1)+2W(1,10=1 \text{ or } 3/8+(2*1/8)+(2*3/16)=1.$$

Error is consequently, distributed in a balanced or space reversed manner on subsequent scanlines (n+1) by using a forward and a backward pixel pass.

Figure 3:
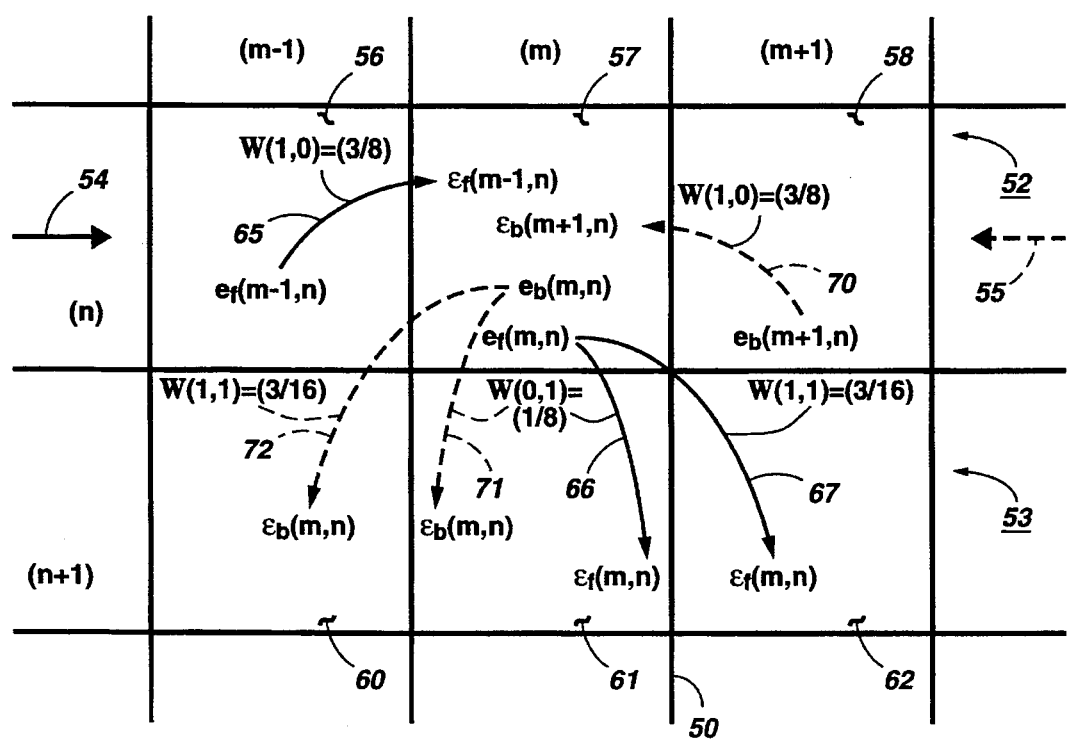
FIG. 3 is a schematic view of pixel positions of an image to illustrate the balanced error diffusion technique of the present invention.

FIG. 3 depicts a schematic view of an image and details the balanced error diffusion technique of the present invention. Input image I and output image B are overlayed on grid 50, where each square represents one pixel value i(m,n) and one output pixel b(m,n). Image I and image B on grid 50 have current scanline (n) 52 and subsequent scanline (n+1) 53. Current scanline 52 and subsequent scanline 53 have three pixels (m−1), (m) and (m+1) identified on grid 50. The forward process direction of input image 50 is depicted by directional arrow 54 and the reverse direction is depicted by directional arrow 55. During the first pass, input image 50 is processed in a forward direction as depicted by directional arrow 54. Initially, as discussed above, the currently processed input pixel i(m,n) at location 57 is adjusted to incorporate a part of the quantization error $e_f(m-1,n)$ of the previous pixel value i(m-1,n) at location 56. The resulting adjusted delayed error correction signal $\epsilon_f(m-1,n)$ is added to the current input pixel i(m,n) to form adjusted input pixel $i'_m(m,n)$ before determining the corresponding output value b(m,n). During the first pass 54, output pixel b(m,n) for the corresponding input pixel i(m,n) is determined using adjusted input pixel $i'_f(m,n)$ which is the sum of input pixel i(m,n) and the quality of the adjusted delayed error correction signal or $\epsilon_f(m-1,n)=e_f(m-1,n) * W(1,0)=e_f(m-1,n) * \frac{3}{8}$. Thus, the weight W(1,0) propagates ⅜ of the previous output pixel error $e_f(m-1,n)$ to the subsequent pixel at location 57, which is show diagrammatically using arrow 65. After determining adjusted input pixel $i'_f(m,n)$ using delayed adjusted error $\epsilon_f(m-1,n)$, part of the resulting error $e_f(m,n)$ is appropriated using weights $W(0,1)=\frac{1}{8}$ and $W(1,1)=\frac{3}{16}$ to form adjusted error correction signal $\epsilon_f(m-1,n)$ and distributed to the subsequent scanline (n+1) pixels at locations 61 and 62, shown by arrows 66 and 67.

During the second pass, the image schematically depicted in FIG. 3 is processed in the reverse direction as shown by the dashed arrow 55. As discussed above, adjusted delayed error correction signal $\epsilon_b(m+1,n)$ is derived from a part of the quantization error $e_b(m+1,n)$ of input pixel i(m+1,n) at location 58. As mentioned previously error correction signal $\epsilon_b(m+1,n)$ (depicted by dashed line 70) is used to define adjusted input pixel $i'_b(m,n)$ for the reverse direction, however, adjusted input pixel $i'_b(m,n)$ is not used to determine corresponding output pixel b(m,n). Adjusted input pixel, $i'_b(m,n)$ is used in conjunction with previously determined output pixel b(m,n) (determined during the forward pass), to define quantization error $e_b(m,n)$. Specifically, quantization error $e_b(m,n)$, is the difference between adjusted input pixel $i'_b(m,n)$ and output pixel b(m,n) determined during the forward pass. Weights $W(0,1)=\frac{1}{8}$ and $W(1,1)=\frac{3}{16}$ define what part of quantization error $e_b(m,n)$ form adjusted error correction signals $\epsilon_b(m,n)$, which are propagated to subsequent scanline pixels i(m-1,n+1) and i(m,n+1) at locations 60 and 61 as depicted by dashed arrows 72 and 71 respectively.

Figure 4:
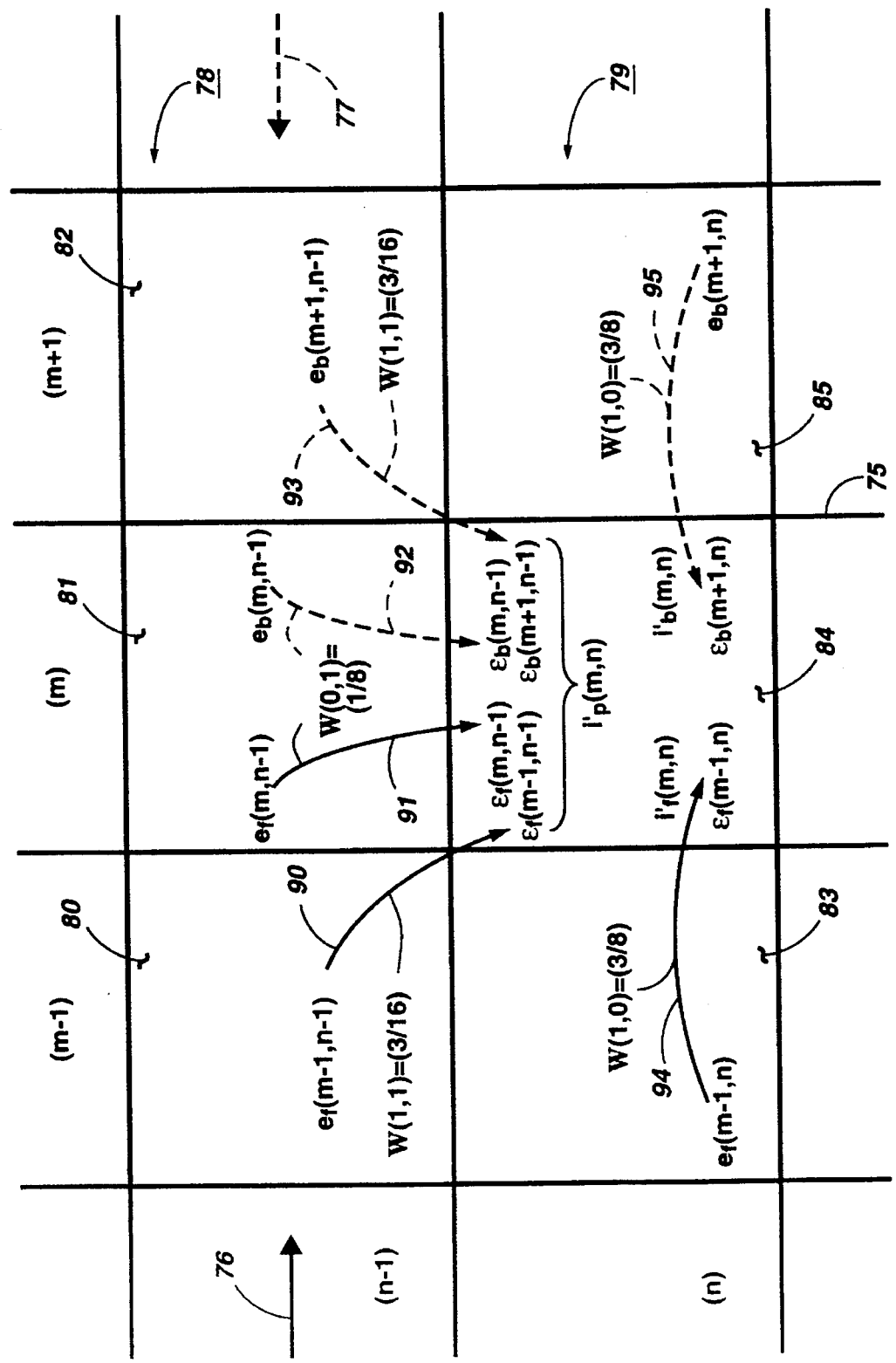
FIG. 4 is a schematic view of pixel positions of an image to illustrate the distribution of error for a single pixel in accordance with the present invention.

FIG. 4 depicts a schematic view of an image that illustrates the distribution of error to a single input pixel 84 shown on grid 75. Input image I and output image B are overlayed on grid 75, where each square represents one input pixel i(m,n) and one output pixel b(m,n). Image I and image B on grid 75 have previous scanline (n-1) 78 and current scanline (n) 79. Previous scanline 78 and current scanline 79 have three pixels (m-1), (m) and (m+1) identified on grid 75. As previously indicated, each scanline is processed first in a forward process direction (during a first pass) and subsequently in a backwards or reverse process direction (during a second pass). The forward process direction is depicted by directional arrow 76 and the reverse process direction is depicted by directional arrow 77.

Initially, the previous scanline (n-1) 78 of the input image I represented on grid 75 is processed in the first and second process directions. Before processing current scanline (n) 79, the input pixel i(m,n) 84 is adjusted to form adjusted input pixel $i'_p(m,n)$ when quantization error is distributed from previous scanline (n-1) 78. Quantization error is distributed from pixels 80, 81, and 82 on previous scanline 78 to pixel 84 on current scanline 79 during a first and second pass of previous scanline 78. Specifically during the forward pass, quantization error distributed to pixel 84 from pixels 80 and pixel 81 is given by error correction signals $\epsilon_f(m-1,n-1)=W(1,1)*e_f(m-1,n-1)$, and $\epsilon_f(m,n-1)=W(0,1)*e_f(m,n-1)$ as shown by arrows 90 and 91, respectively. During the reverse pass, quantization error distributed to pixel 84 from pixels 82 and 81 is given by error correction signals $\epsilon_b(m+1,n-1)=W(1,1)*e_b(m+1,n-1)$, and $\epsilon_b(m,n-1)=W(0,1)*e_b(m,n-1)$ as shown by arrows 93 and 92, respectively. Thus, after completing processing of previous scanline (n-1) and before processing current scanline (n) quantization error distributed to the adjusted input pixel $i'_p(m,n)$ from previous scanline (n-1) is given by:

$$\begin{aligned} i_p'(m,n) &= i(m,n) + W(1,1)*e_f(m-1,n-1) + W(0,1)e_f(m,n-\\ & \quad 1) + W(0,1)e_b(m,n-1) + W(1,1)*e_b(m+1,n-1)\\ &= i(m,n) + \epsilon_f(m-1,n-1) + \epsilon_f(m,n-1) +\\ & \quad \epsilon_b(m,n-1) + \epsilon_b(m+1,n-1). \end{aligned}$$

After processing previous scanline (n-1), current scanline (n) is processed in a forward and a reverse process direction as given by directional arrows 76 and 77, respectively. During the forward pass or forward process direction, quantization error distributed from pixel 83 to pixel 84 is given by error correction signal $\epsilon_f(m-1,n)=W(1,0)*e_f(m-1,n)$ as shown by arrow 94. Thus, during the forward pass of the current scanline, quantization error distributed to input pixel 84 is given by:

$$\begin{aligned} i_f'(m,n) &= i_p'(m,n) + W(1,0)*e_f(m-1,n)\\ &= i_p'(m,n) + \epsilon_f(m-1,n). \end{aligned}$$

During the backwards pass or reverse process direction, quantization error distributed from pixel 85 to 84 is given by error correction signal $\epsilon b(m+1,n)=W(1,0)*e_b(m+1,n)$ as shown by arrow 95. Thus, during the reverse pass of the current scanline, quantization error distributed to input pixel 84 is given by:

$$\begin{aligned} i_b'(m,n) &= i_p'(m,n) + W(1,0)*e_b(m+1,n)\\ &= i_p'(m,n) + \epsilon_b(m+1,n). \end{aligned}$$

Thus, the quantization error from other pixels is distributed to pixel 84 to form adjusted input pixel $i'_f(m,n)$ during the first or forward pass and adjusted input pixel $i'_b(m,n)$ during the second or backwards pass.

During the first pass, once quantization error from other pixels have been distributed to input pixel i(m,n) to form adjusted input pixel $i'_f(m,n)$, corresponding output pixel value b(m,n) for input pixel 84 is determined to be a black value if modified input pixel $i'_f(m,n)$ is less than a threshold value T, otherwise the output pixel value b(m,n) for input pixel 84 is determined to be a white value. First pass or forward pass quantization error $e_f(m,n)$ for pixel 84 is defined as the difference between adjusted input pixel $i'_f(m,n)$ and output pixel value b(m,n). Reverse (or backwards) pass quantization error $e_b(m,n)$ for pixel 84 is defined as the difference between adjusted input pixel $i'_b(m,n)$ and output pixel value b(m,n). Resulting quantization error $e_f(m,n)$ and $e_b(m,n)$ is then distributed as error correction signals $\epsilon_f(m,n)$ and $\epsilon_b(m,n)$, respectively, to a predetermined neighborhood of input pixels as described previously.

Appendix A is a pseudo code listing that shows a specific software implementation for the balanced error diffusion technique illustrated in FIGS. 1 and 2. As an alternative embodiment Appendix B is an extension of the implementation listed in Appendix A. Appendix B includes a fourth weight in the weight matrix W(m,n). In effect, quantization error is distributed to additional input pixel i(m+1,n) using weight W(2,0). Thus, error is distributed in a balanced manner in Appendix B using weights W(1,0), W(2,0), W(0,1) and W(1,1) to a larger set of neighboring input pixels. The weights are adjusted so that they distribute the error evenly by totaling one.

It will no doubt be appreciated that there are a number of possible error distribution weight matrices W(m,n) that could be used effectively with this error diffusion processes. What is required by this invention is that error be distributed in a balanced manner by using a two pass technique. The two pass error dispersion technique first propagates error in a forward direction along a scanline and then in a backwards direction along the same scanline before continuing with subsequent scanlines. The error resulting from the quantization of an input pixel is distributed to a neighboring set of input pixels. The weight matrix W(m,n) appropriates the error so that it is distributed evenly to the surrounding pixels. The two pass technique insures that diffused error does not form correlated patterns such as worms in the output image.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

APPENDIX A

```
/* constants */
whiteValue: CONSTANT = 255;
blackValue: CONSTANT = 0;
threshold: CONSTANT = 127.5;
weight[1,0]: CONSTANT = 3/8;
weight[0,1]: CONSTANT = 1/8;
weight[1,1]: CONSTANT = 3/16;

/*
Function for thresholding a binary image with balanced error diffusion. The function is passed an input image at K
levels and returns and output image at L levels.
*/

BalanceError: FUNCTION [inputImage: ARRAY [0..mPixels-1][0..nScanlines-1] OF BYTE]
   RETURNS [outputImage: ARRAY [0..mPixels-1][0..nScanlines-1] OF BYTE] =
BEGIN /* variables */
n, m : INTEGER;
error, prevError1, modifiedInput: real;

/* for each scanline in the image */
FOR (n=0; n < nScanlines; n ++) DO /* EACH SCANLINE n */
  prevError1 = 0; /* assmue boundary pixel error is zero */
  /* for each pixel in a scanline in the forward direction (0,1,2...) */
  FOR (m=0; m < mPixels; m++) DO /* FIRST PASS */
    BEGIN modifiedInput = inputImage[m][n] + (weight[1,0]*prevError1);
    /* determine output value for pixel m */
    IF (modifiedInput < threshold)
      THEN outputImage[m][n] = blackValue;
      ELSE outputImage[m][n] = whiteValue;

/* calculate error for current pixel m */
    error = modifiedInput - outputImage[m][n];

/* propagate error */
    inputImage[m][n+1] = inputImage[m][n+1] + (weight[0,1] * error);
    inputImage[m+1][n+1] = inputImage[m+1][n+1] + (weight[1,1] * error);
    prevError1 = error;

END; /* FIRST PASS */
```

-20-

APPENDIX A

```
prevError1 = 0; /* assmue boundary pixel error is zero */
/* for each pixel in a scanline in the backward direction (m-1,m-2,m-3...) */
FOR (m=mPixels-1; m >= 0; m--) DO /* SECOND PASS */
   BEGIN modifiedInput = inputImage[m][n] + (weight[1,0]*prevError1);

/* calculate error for current pixel m */
   error = modifiedInput - outputImage [m][n];

/* propagate error */
   inputImage[m][n+1] = inputImage[m][n+1] + (weight[0,1] * error);
   inputImage[m-1][n+1] = inputImage[m-1][n+1] + (weight[1,1] * error);
   prevError1 = error;
   END; /* SECOND PASS */
  END; /* EACH SCANLINE */
END; /* BalanceEror */
```

APPENDIX B

```
/* constants */
whiteValue: CONSTANT = 255;
blackValue: CONSTANT = 0;
threshold: CONSTANT = 127.5;
weight[1,0]: CONSTANT = 3/8;
weight[2,0]: CONSTANT = 1/8;
weight[0,1]: CONSTANT = 1/8;
weight[1,1]: CONSTANT = 1/8;

/*
function for thresholding a binary image with balanced error diffusion. The function is passed an input image at K
levels and returns and output image at L levels.
*/

BalanceError: FUNCTION [inputImage: ARRAY [0..mPixels-1][0..nScanlines-1] OF BYTE]
    RETURNS [outputImage: ARRAY [0..mPixels-1][0..nScanlines-1] OF BYTE] =
BEGIN /* variables */
n, m : INTEGER;
error, prevError1, prevError2, modified input: real;

/* for each scanline in the image */
FOR (n=0; n < nScanlines; n ++) DO /* EACH SCANLINE n */
  prevError1 = prevError2 = 0; /* assmue boundary pixel error is zero */
  /* for each pixel in a scanline in the forward direction (0,1,2...) */
  FOR (m=0; m < mPixels; m++) DO /* FIRST PASS */
    BEGIN modifiedInput = inputImage[m][n] + (weight[1,0]*prevError1 + weight[2,0]*prevError2);
    /* determine output value for pixel m */
    IF (modifiedInput < threshold)
      THEN outputImage[m][n] = blackValue;
      ELSE outputImage[m][n] = whiteValue;

/* calculate error for current pixel m */
    error = modifiedInput - outputImage[m][n];

/* propagate error */
    inputImage[m][n+1] = inputImage[m][n+1] + (weight[0,1] * error);
    inputImage[m+1][n+1] = inputImage[m+1][n+1] + (weight[1,1] * error);

prevError2 = prevError1;
    prevError1 = error;

END; /* FIRST PASS */
```

-22-

APPENDIX B

```
prevError1 = prevError2 = 0;  /* assmue boundary pixel error is zero */
/* for each pixel in a scanline in the backward direction (m-1,m-2,m-3...) */
FOR (m=mPixels-1; m >= 0; m --) DO /* SECOND PASS */
   BEGIN modifiedInput = inputImage[m][n] + (weight[1,0]*prevError1 + weight[2,0]*prevError2);

/* calculate error for current pixel m */
   error = modifiedInput - outputImage [m][n];

/* propagate error */
   inputImage[m][n+1] = inputImage[m][n+1] + (weight[0,1] * error);
   inputImage[m-1][n+1] = inputImage[m-1][n+1] + (weight[1,1] * error);

prevError2 = prevError1;
   prevError1 = error;
   END; /* SECOND PASS */
  END; /* EACH SCANLINE */
END; /* BalanceEror */
```

I claim:

1. An apparatus that maintains the average density of an input image while converting the input image having image signals with K density levels that are ordered in successive scanlines to an output image with L density levels, where L is less than K, for output to a device capable of rendering images having L density levels, the apparatus comprising:

a first memory for storing the input image signals;

means for adding to each input image signal i(m,n) stored in said memory error correction signals ε(m,n) to provide corrected image signals i'(m,n) with adjusted density levels that reflect the average density level of the input image;

means for comparing each corrected image signal of the input image to a predefined threshold value T to determine an output image signal b(m,n) defined by L density levels for each image signal of the output image, said comparing means comparing each corrected image signal on each of the successive scanlines in a first process direction;

a second memory for storing said output image signal to be rendered on the output device that is limited to images having L density levels;

means for deriving a first quantization error $e_f(m,n)$ and a second quantization error $e_b(m,n)$ for each output image signal determined by said comparing means;

means for propagating the first quantization error of each image signal to a predetermined neighborhood of input image signals, said propagating means forming error correction signals to be directed to each input image signal using a fraction of the first quantization error; and means for reversing the direction said propagating means distributes the second quantization error to the predetermined neighborhood of input image signals, said reversing means directing said propagating means in a second process direction opposite to the first process direction, the second quantization error being propagated in the second process direction without modifying each output image signal determined in the first process direction, whereby said propagating means reduces correlated patterns formed in the output image.

2. The apparatus of claim 1, wherein the ordered scanlines of the input image are two dimensional arrays.

3. The apparatus of claim 1, wherein said reversing means directs said propagating means first in a forward pixel order and subsequently in a backward pixel order, said controlling means effectively propagating quantization error in two directions along a scanline of the input image.

4. The apparatus of claim 1, wherein the neighborhood of input image signal to which quantization error is propagated is defined by a weight matrix W(m,n).

5. The apparatus of claim 4, wherein said weight matrix W(m,n) sums to one after two passes.

6. The apparatus of claim 5, wherein said weight matrix defined by $W(1,0)=3/8$, $W(0,1)=1/8$ and $W(1,1)=3/16$ sums to one after two passes.

7. The apparatus of claim 1, wherein said first and second memory is a hard drive.

8. The apparatus of claim 1, wherein said first and second memory is a floppy drive.

9. The apparatus of claim 4, wherein said error correction signals is given by the product of said weight matrix W(m,n) and the first quantization error.

10. A method of quantizing input image signals having K density levels that form an input image with an average density level, the quantized signals defining image signals of an output image having L density levels where L is less than K, the steps comprising:

determining an output signal b(m,n) for each input signal i(m,n) by comparing a first adjusted input signal i'$_f$(m,n) with a predefined threshold value T, the difference of the output signal and the first adjusted input signal i'$_f$(m,n) defining a first quantization error signal $e_f(m,n)$, said determining step operating sequentially on each input image signal forming the input image in a first process direction;

deriving a second quantization error $e_b(m,n)$, the difference of the output pixel value b(m,n) and a second adjusted input pixel signal i'$_b$(m,n) defining the second quantization error; and adjusting input signals i(m,n+1) on a subsequent scanline with part of the first quantization error signal and part of the second quantization error signal, said adjusting step propagating the first quantization error signal and the second quantization error signal in a balanced manner by initially propagating the first quantization error signal to input image signals on the subsequent scanline in the first process direction and by subsequently propagating the second quantization error signal to input image signals on the subsequent scanline in a second process direction opposite to the first process direction, in order to generate the output image with fewer correlated patterns formed while maintaining the average density level of the input image.

11. The method as described in claim 10, wherein said adjusting step first propagates the first quantization error over the input image in a forward pixel direction and then propagates the second quantization error in a backwards pixel direction.

12. The method as described in claim 11, wherein said adjusting step propagates said first quantization error signal using a weight matrix W(m,n).

13. The apparatus of claim 12, wherein said weight matrix W(m,n) sums to one after two passes.

14. The apparatus of claim 13, wherein said weight matrix defined by $W(1,0)=3/8$, $W(0,1)=1/8$ and $W(1,1)=3/16$ sums to one after two passes.

15. A method of quantizing pixel values to form an output image that maintains the average density level of an input image, in which the input image is formed by a plurality of pixel values ordered in successive scanlines, each pixel value representing a density level of the input image at a location within the input image, and having an original density level associated therewith selected from one of a set of "K" original density levels, where "K" is a number of members larger than a desired output set of "L" density levels the steps comprising:

receiving an input pixel value i(m,n);

adjusting said input pixel value with a previously determined adjusted delay error ε(m,n), if any, to derive adjusted input pixel values i'(m,n);

determining an output pixel value b(m,n) in a first process direction by comparing a first adjusted input pixel value i'$_f$(m,n) with a predefined threshold value T, the difference of the output pixel value b(m,n) and the first adjusted input pixel value defining a first quantization error $e_f(m,n)$;

deriving a second quantization error $e_b(m,n)$, the difference of the output pixel value b(m,n) and a second adjusted input pixel value i'$_b$(m,n) defining the second quantization error; and adjusting input pixel values i(m,n+1) on a subsequent scanline that have an undetermined output pixel value b(m,n), with part of the first quantization error and with part of the second quantization error, said adjusting step propagating the first quantization error and the second quantization error in a balanced manner by first propagating the first quantization error to input pixel values on the subsequent scanline in the first process direction and then by propagating the second quantization error to input pixel values on the subsequent scanline in a second process direction opposite to the first process direction, in order to reduce the formation of correlated patterns in the output image.

16. An improved error diffusion technique that maintains the average density of an input image while converting the input image having image signals with K density levels that are ordered in successive scanlines to an output image with L density levels, where L is less than K, for output to a device capable of rendering images having L density levels, comprising the steps of:

adding to each input image signal i(m,n) stored in a first memory error correction signals $\epsilon(m,n)$ to provide corrected image signals i'(m,n) with adjusted density levels that reflect the average density level of the input image;

comparing each corrected image signal of the input image to a predefined threshold value T to determine an output image signal b(m,n) defined by L density levels for each image signal of the output image, said comparing step comparing each corrected image signal on each of the successive scanlines in a forward pixel order;

storing in a second memory the output image signal to be rendered on the output device that is limited to images having L density levels;

deriving a first quantization error $e_f(m,n)$ for each output image signal determined by said comparing step, the difference of the output image signal and a first corrected image signal $i'_f(m,n)$ defining the first quantization error;

propagating the first quantization error of each image signal to a predetermined neighborhood of input image signals, said propagating step forming error correction signals to be directed to each input image signal using a fraction of the first quantization error;

deriving a second quantization error $e_b(m,n)$ for each output image signal determined by said comparing step, the difference of the output image signal and a second corrected image signal $i'_b(m,n)$ defining the second quantization error; and reversing the direction the second quantization error is propagated to the predetermined neighborhood of input image signals by said propagating step, said reversing step directing said propagating step in a backward pixel order, the second quantization error being propagated in the backwards pixel order without modifying each output image signal determined in the forward pixel order, whereby a reduced number of correlated patterns are formed in the output image.

17. A printing system capable of printing images having L density levels including an image processing system that converts an input image having image signals with K density levels that are ordered in successive scanlines to an output image having output image signals with L density levels, where L is less than K, the image processing system converting images so that the printing system is capable of printing images that originally have K density levels, the printing system comprising:

a memory;

means for receiving in said memory scanned input image with K density levels;

means for adding to each input image signal i(m,n) stored in said memory error correction signals $\epsilon(m,n)$ to provide corrected image signals i'(m,n);

means for comparing each corrected image signal of the input image to a predefined threshold value T to determine an output image signal b(m,n) having L density levels for printing on the printing system, said comparing means comparing each corrected image signal on each of the successive scanlines in a forward pixel order;

means for deriving a first quantization error $e_f(m,n)$ and a second quantization error $e_b(m,n)$ for each output image signal determined by said comparing means;

means for propagating the first quantization error of each output image signal to a predetermined neighborhood of input image signals, said propagating means forming error correction signals to be directed to each input image signal using a fraction of the first quantization error; and means for reversing the direction said propagating means distributes the second quantization error to the predetermined neighborhood of input image signals, said reversing means directing said propagating means in a backward pixel order, the second quantization error being propagated in the backward pixel order without modifying each output image signal determined in the forward pixel order, in order that said propagating means reduces the formation of correlated patterns in the output image printed on the printing system made up of the output image signals.

* * * * *